US012715023B2

(12) United States Patent
Wiesmann et al.

(10) Patent No.: US 12,715,023 B2
(45) Date of Patent: Aug. 25, 2026

(54) SORTING ARRANGEMENT FOR SORTING OBJECTS AND A CORRESPONDING METHOD

(71) Applicant: BEUMER GROUP GMBH & CO. KG, Beckum (DE)

(72) Inventors: Thomas Wiesmann, Beckum (DE); Harald Hanaweg, Dobl-Zwaring (AT)

(73) Assignee: BEUMER GROUP GMBH & CO. KG, Beckum (DE)

( * ) Notice: Subject to any disclaimer, the term of this patent is extended or adjusted under 35 U.S.C. 154(b) by 0 days.

(21) Appl. No.: 18/576,465

(22) PCT Filed: Jul. 6, 2022

(86) PCT No.: PCT/DE2022/100483
§ 371 (c)(1),
(2) Date: Jan. 4, 2024

(87) PCT Pub. No.: WO2023/280347
PCT Pub. Date: Jan. 12, 2023

(65) Prior Publication Data

US 2024/0326096 A1 Oct. 3, 2024

(30) Foreign Application Priority Data

Jul. 9, 2021 (EP) .................................... 21184871

(51) Int. Cl.
*B07C 3/08* (2006.01)

(52) U.S. Cl.
CPC .................................. *B07C 3/087* (2013.01)

(58) Field of Classification Search
CPC .......... B07C 3/08; B07C 3/087; B07C 3/082; B07C 5/06; B07C 5/165

(Continued)

(56) References Cited

U.S. PATENT DOCUMENTS 4,310,276 A 1/1982 Castagnoli
6,151,866 A * 11/2000 Connell ............ A22C 21/0053 209/657

(Continued)

FOREIGN PATENT DOCUMENTS

AT 14694 U1 4/2016
DE 3010213 A1 10/1980

(Continued)

OTHER PUBLICATIONS

LOXXESS YouTube video veroffentlicht am Jan. 30, 2018 unter www.youtube.com/watch?v=bl7X9MiiuWA).

(Continued)

*Primary Examiner* — Michael McCullough
*Assistant Examiner* — Jessica L Burkman
(74) *Attorney, Agent, or Firm* — Harness, Dickey & Pierce, P.L.C.

(57) ABSTRACT

A sorting arrangement for sorting objects, in particular mail items, of different shapes, volumes and/or weights, wherein the sorting arrangement has a deck sorter with a plurality of load receiving means for objects to be sorted, which are moved along a sorting path of the deck sorter and can be individually controlled for discharging an object resting on it into at least one first end point of the sorting arrangement, wherein the sorting arrangement has a pouch sorter with a plurality of load receiving means designed as hanging pouches for objects to be sorted, wherein the pouch sorter has a pouch emptying, from which the pouches are emptied into at least one second end point different from the at least one first end point, the same sorting target being assigned to these two end points. A corresponding method is also described.

11 Claims, 5 Drawing Sheets

Figure 1:
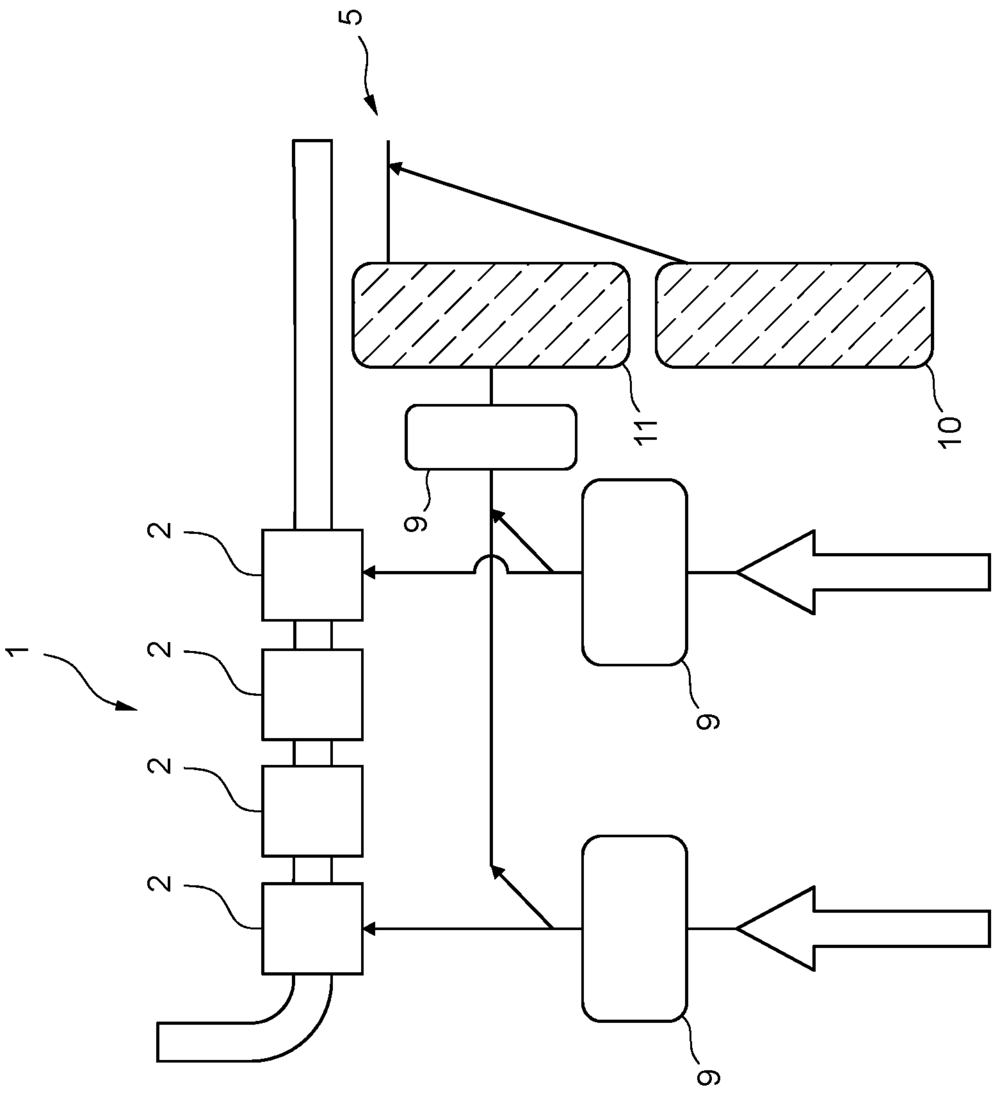

(58) Field of Classification Search
USPC .......................................................... 209/606
See application file for complete search history.

(56) References Cited

U.S. PATENT DOCUMENTS

| | | | | |
|---|---|---|---|---|
| 7,235,756 | B2 | 6/2007 | De Leo et al. | |
| 7,304,259 | B2 * | 12/2007 | Schwarz ............ | G01N 15/1456 209/509 |
| 10,781,044 | B2 * | 9/2020 | Kasper ................... | B65G 1/137 |
| 11,072,498 | B2 * | 7/2021 | Schnadwinkel ..... | B65G 1/1378 |
| 2007/0022719 | A1 * | 2/2007 | Berdelle-Hilge ....... | B07C 3/082 53/437 |
| 2007/0090027 | A1 * | 4/2007 | Haselberger ............ | B07C 3/082 209/584 |
| 2011/0180462 | A1 | 7/2011 | Cartal et al. | |
| 2020/0269282 | A1 * | 8/2020 | Bombaugh ............... | B07C 3/02 |
| 2021/0221623 | A1 | 7/2021 | Schnadwinkel et al. | |

FOREIGN PATENT DOCUMENTS

| | | | |
|---|---|---|---|
| DE | 10-2006-025617 | B4 | 10/2009 |
| DE | 102018219583 | B4 | 8/2020 |
| EP | 1500440 | A1 | 1/2005 |
| FR | 2940151 | A1 | 6/2010 |
| WO | 2020-163885 | A1 | 8/2020 |

OTHER PUBLICATIONS

Stockmann YouTube Video veroffentlicht am Jan. 30, 2018 unter www.youtube.com/watch?v=iLy3FbK5p2s).

International Search Report (English and German) and Written Opinion of the ISA (German) issued in PCT/DE2022/100483, mailed Sep. 20, 2022; ISA/EP.

* cited by examiner

SORTING ARRANGEMENT FOR SORTING OBJECTS AND A CORRESPONDING METHOD

CROSS-REFERENCE TO RELATED APPLICATIONS

This application is a U.S. National Phase Application under 35 U.S.C. 371 of International Application No. PCT/DE2022/100483, filed on Jul. 6, 2022, which claims the benefit of European Patent Application No. 21184871.8, filed on Jul. 9, 2021. The entire disclosures of the above applications are incorporated herein by reference.

BACKGROUND

This section provides background information related to the present disclosure which is not necessarily prior art.

TECHNICAL FIELD

The invention is based on a sorting arrangement for sorting objects, in particular mail items, of different shapes, volumes and/or weights, wherein the sorting arrangement has a deck sorter with a plurality of load receiving means for objects to be sorted, which are moved along a sorting path of the deck sorter and can be individually controlled for discharging an object resting on one of the load receiving means into at least one first end point of the sorting arrangement. The sorting arrangement furthermore has a pouch sorter with a plurality of load receiving means designed as hanging pouches for objects to be sorted. Such a sorting arrangement is known from DE 10 2018 219 583 B4.

DISCUSSION

FR 2 940 151 A1 shows the merging of letters with standard letter mail, wherein both types were previously discharged into a respective separate sorting end point.

Distribution centers of the courier express parcel (CEP) industry have the task of receiving parcels, packages and other items of goods, in general items of mail, within certain dimensions and weights and distributing them to shipping directions. In contrast to warehouse shipping centers, CEP distribution centers are not designed to handle orders, but rather to distribute the delivered volume of parcels and other items of mail as completely as possible in a defined time window, during the so-called shift. In this case, the items of mail arrive in a temporally uncorrelated manner and in a wide variety of transport means in the CEP distribution center. In this case, the items of mail are not necessarily separated according to size. The items of mail can be unloaded automatically, semi-automatically or manually.

Loosely loaded items of mail can be placed immediately on the sorting system, while for packaged items of mail which are delivered, for example, on pallets or in roll containers, the order can be placed on a sorter of the distribution center only if personnel for unloading and free capacity are available on the deck sorter and/or a terminal.

The items of mail are distributed after the address label of the item of mail which contains the direction information has been read in. The direction information predominantly forms the only sorting criterion which is obtained from an address database. During a shift, the assignment of the directions to the sorting end points is usually fixed, with the result that there is little scope for optimizations with regard to personnel use, for example with regard to the travel routes.

The deck sorters used can be embodied as closed loops (loop sorters) or in line form (line sorters). Both types have in common that their number of load receiving means (LAM) on which the items of mail are transported to the end points is small in relation to the distributed number of items of mail per hour, wherein the ratio is typically less than 1:10. For example, a package sorter 500 meters long can have 500 LAMs, with a distribution capacity of 9,000 items of mail per hour. This is due in particular to the comparatively high cost share of the LAMs in the entire deck sorter.

The distribution capacity of a deck sorter has its practical limits, which is usually approximately 10,000 to 20,000 items of mail per hour. In order to achieve higher capacities within a distribution center, a plurality of sorters are therefore used, which usually discharge into common end points. The relatively small number of LAMs has the consequence that an LAM can only be occupied by one item of mail as intended from the task until it reaches the end point for the first time and has to be made available for a new occupation after the discharge of the item of mail into the end point. In the case of longer holding times of the items of mail for the purpose of intermediate storage, the distribution capacity of the sorter would fall sharply. A sorter is therefore not suitable and provided for the intermediate storage of items of mail.

The function of the intermediate storage of the items of mail which are sent in the same direction is accordingly performed by the end points. For operational reasons, the items of mail are collected in the end point before a distribution center employee removes them and loads them. The loading can take place as loose in swap decks or trucks, in roll containers, sacks or other containers. Small items of mail are often also discharged directly into transport means, in particular when small goods sorters are used. A specific sequence of the items of mail in the end points corresponding to a delivery list (stop list of the parcel carrier) cannot be generated. The number of required end points results from the operational requirement, consequently from the number of directions which are to be loaded by the distribution center.

The number and the storage volume of the end points determine the area requirement of the end points in the distribution center and therefore significantly influence the size and the costs of the building and of the sorter which has to reach the end points. End points are usually located on the hall floor for operational reasons and compete with the rest of the logistic management. They therefore constitute a cost-intensive storage medium.

The emptying of the end points and loading of the items of mail takes place predominantly by employees of the distribution center. The actual loading activity is accompanied by the unproductive travel routes which an employee has to cover in order to go to a full end point and empty it. If full end points are not emptied immediately, the items of mail intended for this end point remain on the sorter and therefore reduce the distribution capacity of the sorter. The last minutes of a shift before the so-called cut-off time constitute a particular challenge. It is true that as many items of mail as possible are to be distributed and sent in order to achieve a high degree of service. However, the personnel requirement increases considerably if all the end points are still to be emptied shortly before the cut-off time.

SUMMARY

This section provides a general summary of the disclosure and is not a comprehensive disclosure of its full scope or all of its features.

It is therefore one aspect of the invention to further develop the sorting arrangement described at the beginning in such a way that it has a high sorting capacity on the one hand and a high temporal flexibility when loading the end points on the other hand.

Accordingly, it is provided in the sorting arrangement that the pouch sorter has a pouch emptying, from which the pouches are emptied into at least one second end point different from the at least one first end point.

The invention is therefore based on the finding that the sorting capacity of the deck sorter can be increased with the aid of the buffer function of the pouch sorter despite the buffer function not present in the deck sorter. It is thus possible, for example, that only those objects to be sorted are fed to the deck sorter of the first end point which, for example on account of their dimensions, their weight or other properties, are not suitable for being operated by the pouch sorter. This relates in particular to particularly large and/or bulky objects which, however, according to experience represent only 5 to at most 10% of the mail volume in the KEP range.

Thus, for example, the sorting capacity of the deck sorter can be used exclusively to sort the aforementioned objects which cannot be processed by the pouch sorter, while the objects to be sorted which are simultaneously produced by the pouch sorter are emptied by the pouch sorter into the second end point. The latter can, however, be carried out temporally offset and/or only in response to a request. Up to the request, the objects can be kept available in a buffer store of the pouch sorter. Accordingly, the second end point can also be provided only immediately before the request, for example at an unloading station of the pouch sorter for the transfer of the objects from the pouch sorter to the second end point. As a result, the utilization of the footprint of the distribution center is reduced and at the same time the sorting capacity of the deck sorter is increased, since the latter is no longer loaded with the objects sorted by the pouch sorter.

The sorting arrangement can furthermore have a combination with which the first and second end points having the same sorting target are combined. The combination can have the combination of the sorting volumes of the first and second end points. For this purpose, it can be provided that the volumes of the sorted objects of the two end points are combined in one end point to form a coherent volume or bundle. However, the combination or the combination of the sorting volumes of the first and second end points does not necessarily and preferably does not mean that the two sorting volumes are combined to form a single volume, are mixed or tilted into one another or are otherwise irreversibly combined without further sorting. Rather, it can preferably be provided that the sorting volumes of the first and second end points combined in the context of the combination are also still retained as separate sorting volumes even after the combination. For example, the end points can in each case represent a grid box which have the same sorting target and are combined for the common further transport to the sorting target or an intermediate station and are loaded together, for example, onto a transport vehicle. The combination can accordingly also be the logical combination of two transport means, for example two grid boxes, so that these form a logical unit for the further transport.

For example, in the end point, the objects sorted by the first end point, which can have a larger individual volume and a larger individual weight in comparison with the sorted objects of the second end point, can be arranged in the end point below the sorted objects of the second end point in order to achieve the object-friendly further transport of the sorted objects in the end point.

The deck sorter can have a fixed number of load receiving means and can preferably have a line sorter and/or a circulating sorter or can be a line sorter or a circulating sorter.

Depending on an object-specific selection criterion, an object to be sorted can be fed either into the deck sorter or into the pouch sorter. The object-specific selection criterion can be an object weight, an object volume, an object shape, an object dimension, an object shape or an object target. The sorting arrangement can have a dimensioning-weighing-scanning system for detecting the object-specific selection criterion.

The pouch sorter can have at least one pouch buffer, in which at least one group of a plurality of the pouches of the pouch sorter are kept available, which have the same sorting target, for example are intended to be emptied into the same second end point. Preferably, a plurality of these groups of in each case a plurality of pouches are kept available in the pouch buffer. At least two of the groups can differ from one another in that each group is assigned a different sorting target.

The pouch buffer can have a plurality of buffer circuits arranged parallel to one another, from which the pouches can be discharged individually or in groups. If the pouch buffer has a plurality of buffer circuits, it can be provided that the pouches with the same sorting target are kept available in the same buffer circuit of the pouch sorter. In this case, the pouches in the buffer circuit do not have to have further sorting. In particular, it is not necessary for the pouches with the same sorting target to be arranged successively in the buffer circuit and/or to have sequencing. Rather, by selective discharging from the buffer circuit, it can be achieved that only the pouches of the same group of pouches with the same sorting target are discharged from the buffer circuit.

After discharging from the pouch buffer, the pouches of the same group of pouches with the same sorting target can be fed directly to the second end point as a compact group of pouches. The pouches within the group have a random sequence. If, furthermore, sequencing of the pouches in the group is provided, the pouches of the group can be fed to sequencing. With the sequencing, which can be designed, for example, as a sorting matrix, the pouches within the group are brought into a preferred sequence.

Alternatively, sequencing is possible when discharging the pouches of the same group from the pouch buffer in that the pouches are discharged from the buffer circuit in the sequence of the desired sequence. Accordingly, the final sequence of the pouches is already produced during the discharge from the buffer, with the result that a sorting matrix following the buffer or other sequencing can be saved. However, this variant has the disadvantage that, in particular in the case of long buffer circuits, the sorting capacity is reduced on account of the multiplicity of required complete circulations of the pouches.

The pouch buffer has the advantage that the second end point has to be provided only for the actual unloading of the buffer into the end point and, in particular, not, as in the case of the sorting arrangements known from the prior art, during the entire sorting process for each individual discharge of an item of mail, for example from a deck sorter.

Accordingly, the pouch sorter for the sorting of the pouches of the group discharged from the pouch buffer, with the result that they have a desired sequence, can have sequencing which is set up to bring the pouches discharged from the buffer into a sequence in which they are fed to the end point. The pouches which are sorted in relation to their sorting target and which are brought into a specific sequence as a result of the sequencing form the so-called batch.

The pouch sorter has the property that the number of LAMs, consequently of the pouches, can be scaled as desired. The relatively low costs per LAM allow the LAMs to be used not only for the pure transport and sorting task but also for the intermediate storage and sequencing of the items of mail.

The intermediate storage can typically be built into a free space of a hall by the hanging arrangement of the LAMs, without occupying functional and cost-intensive floor space. Furthermore, the use of this sorting technology with a buffer and sequencing function allows the decoupling of logical sorting targets (LAM unloading station) and physical end points.

The distribution of the objects to be sorted to the sorters of the sorting arrangement can be structured, for example, as follows. Small items of mail are conveyed automatically for loading a load receiving means of the pouch conveyor. Conveyable items of mail are divided into those that can be transported both on a deck sorter and on a pouch sorter, and those that can only be sorted on a deck sorter.

Items of mail which can be sorted via a deck sorter are discharged directly into the respective first end point. The same applies to manually treated non-conveyable items of mail which are brought manually directly to the first end point or to a further end point in which the first and the second end point are consolidated. Alternatively, the non-conveyable items of mail can be brought into an intermediate store for manual distribution.

Items of mail which are sorted by the pouch sorter can be buffered on the latter. The intermediate storage can take place in a dynamic buffer which can consist, for example, of any desired number of pouches and therefore ensures a high flexibility. Only when a criterion for the discharge occurs can the items of mail be discharged from the dynamic buffer in a targeted manner and discharged to a pouch buffer (dynamic batch buffer). However, these criteria are typically not limited to departure times, total volume of the sorted items of mail with the same shipping destination, prioritizations, weight classes, size classes and the like.

The pouch buffer (dynamic batch buffer) can have a pre-sorting. For example, the pouch buffer can have a plurality of buffer circuits, wherein all pouches which are intended to be fed to the same second end point are kept available in the same buffer circuit until they are discharged from the buffer circuit as a group of pouches with the same sorting target, for example in response to a request. Preferably, a plurality of groups of pouches which are intended to be fed to the same second end point or have the same sorting target can be received, i.e. buffered, in each of the buffer circuits.

This pre-sorting in the pouch buffer (dynamic batch buffer) can take place fully automatically on the basis of at least one criterion. However, these criteria are typically not exclusively the departure time, an identification of the forwarding agent, the already mentioned total volume of the objects of the same shipping destination, a prioritization, a weight class, a size class and/or the like.

The intermediate storage which takes place in the deck sorter substantially at the sorting end points is performed by the respective buffer in the pouch sorter. Unlike in the deck sorter, the buffer capacity, or the capacity for receiving additional pouches, in the pouch sorter can also be extended virtually as desired at vertical height. As a result, valuable functional floor space is available for other tasks and is no longer occupied by buffer media (in particular end points).

The described arrangement therefore makes it possible to increase the sorting capacities, to increase buffer capacities, to use the existing construction volume of a distribution center more intelligently and to reduce structural infrastructure requirements and to produce sequences in the sorting in order to facilitate the downstream processes.

According to another aspect, a method for sorting objects, in particular mail items, of different shapes, volumes or weights is proposed which has the sorting of a plurality of objects to be sorted with a deck sorter into at least one first end point of the deck sorter. The method furthermore has the sorting of a plurality of objects to be sorted with a pouch sorter with a plurality of load receiving means designed as hanging pouches for objects to be sorted. The method is distinguished in that it has the emptying of the pouches of the pouch sorter into at least one second end point different from the at least one end point, the same sorting target having been assigned to these two end points. The method can be carried out with a sorting arrangement of the type described above.

The method can preferably be carried out with a sorting arrangement of the type described above.

The method can have the combining of pairs from one of the first and one of the second end points to which the same sorting target is assigned.

The method can furthermore have the determining of an object-specific selection criterion for each of the plurality of objects to be sorted, the objects to be sorted being fed into the deck sorter or into the pouch sorter depending on the determined object-specific selection criterion.

The determining of the object-specific selection criterion can have the determining of an object weight, an object dimension or an object volume and the comparing of an object weight determined in this case, an object dimension determined in this case or an object volume determined in this case with a respectively permissible value range for the feeding into the pouch sorter.

In this case, in the case where the determined object-specific selection criterion lies outside the permissible value range for the feeding into the pouch sorter, the object to be sorted can be fed into the deck sorter or fed out for the manual sorting.

The method can have the buffering of a plurality of the pouches of the pouch sorter, which are intended to be emptied into the same second end point, before the pouches are fed to the second end point as a compact group of pouches and the objects received in the pouches are emptied into the second end point simultaneously or in a continuous sequence.

The method can furthermore have the sequencing of the pouches of the group after the buffering and before the emptying of the pouches into the end point, with the result that the pouches of the group are brought into a specific sequence with which they are fed to the second end point. The sequencing forms, from the pouch group consisting of pouches with the same sorting target which are unsorted with respect to their sequence, a pouch batch of pouches with the same sorting target which have a specific sequence with respect to one another beyond the properties of the pouch group.

The objects to be sorted can be sorted by the deck sorter directly into their assigned first end point. In this case, the objects to be sorted can be sorted by the pouch sorter after the feeding into the pouch sorter into their assigned second end point only when a sorting criterion for the consolidated sorting of all objects fed into the pouch sorter and assigned to the same end point is reached or a sorting command is generated.

The method can furthermore have the summing up of at least one physical variable, preferably a weight and/or a volume, of all objects assigned to the same end point and to be sorted which have been fed into the pouch sorter, these objects to be sorted being emptied into the second end point when a threshold value for the physical measurement variable is reached.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations and are not intended to limit the scope of the present disclosure.

Figure 2:
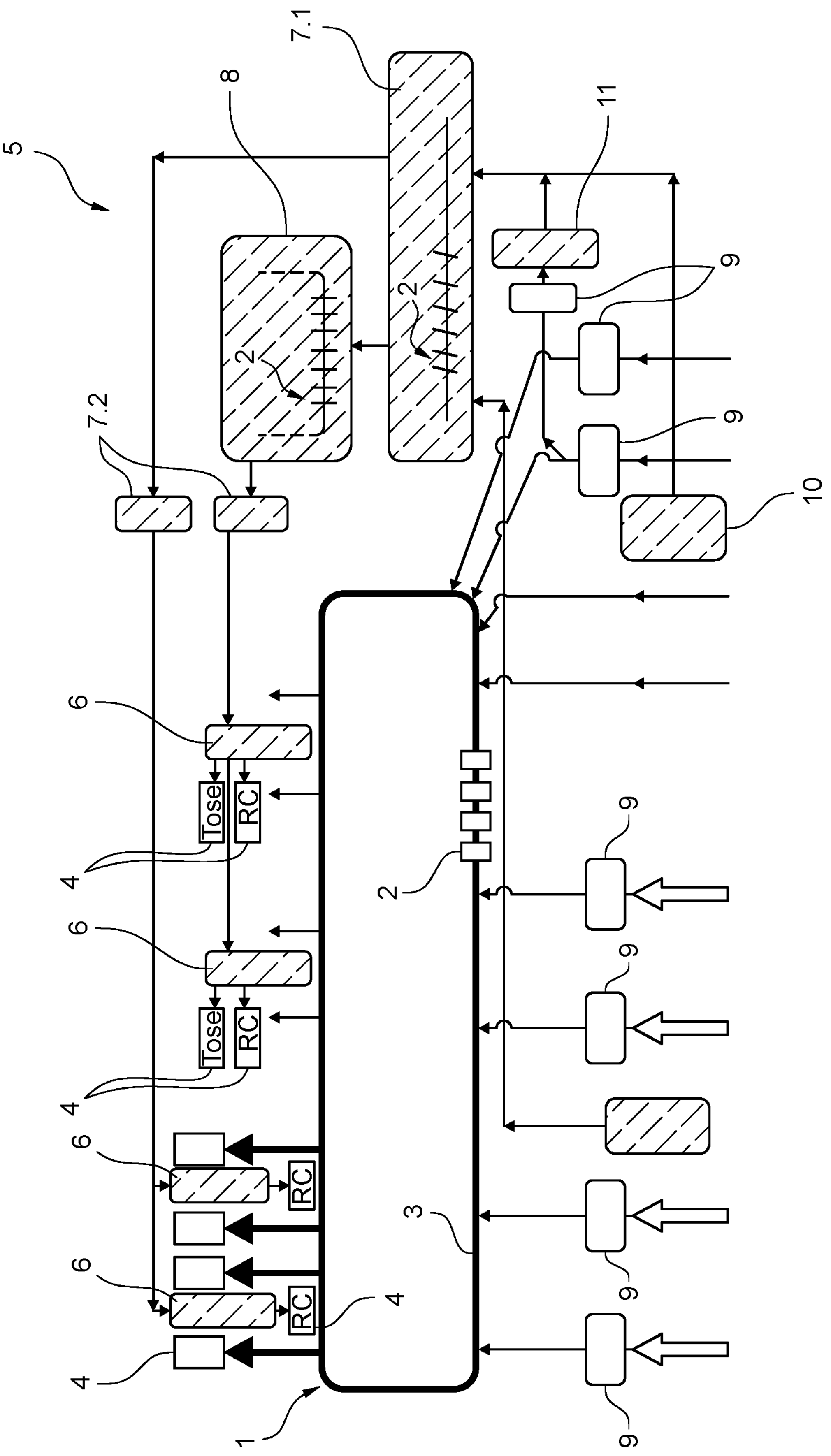
Figure 3:
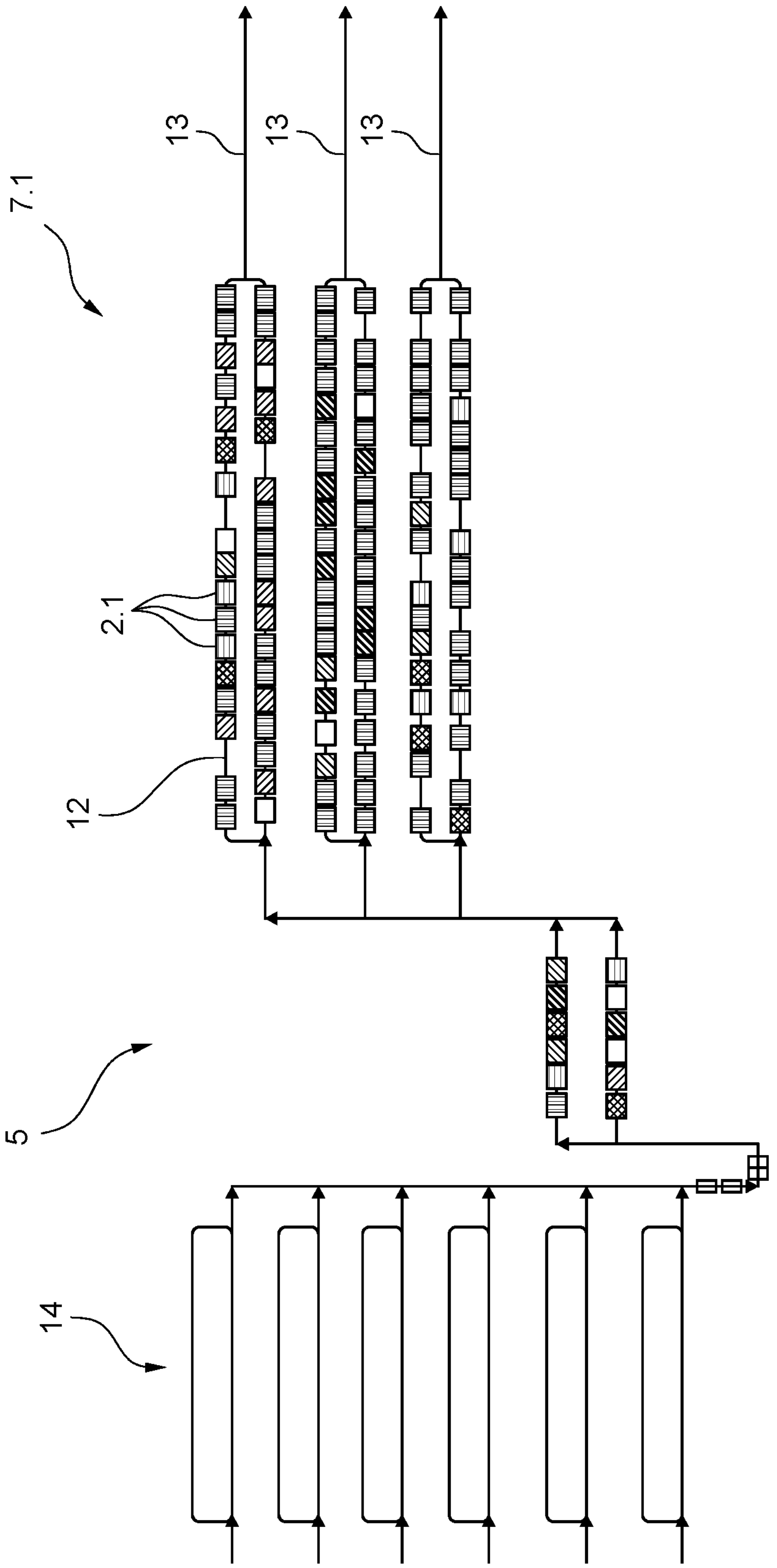
Figure 4:
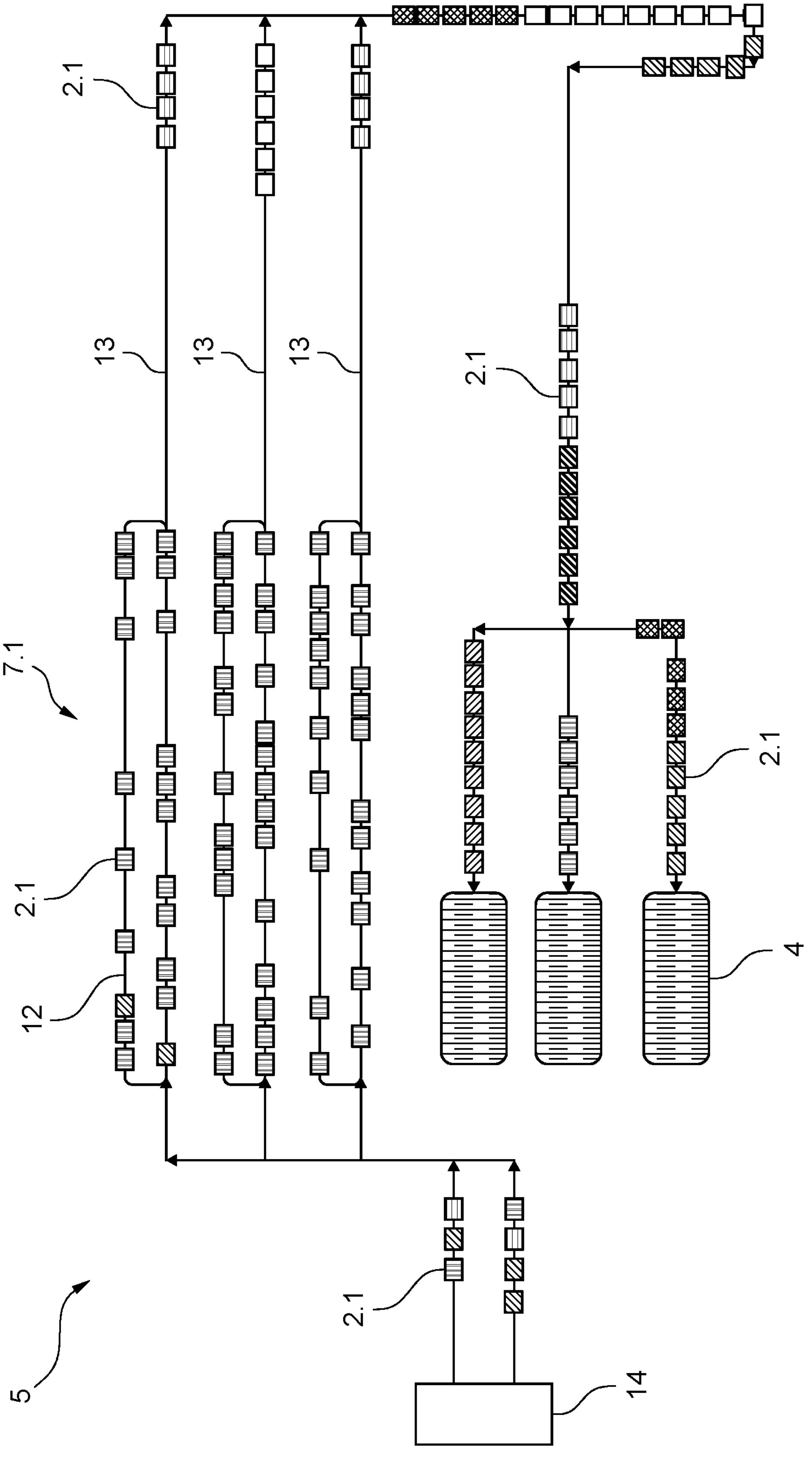

Advantageous embodiments of the invention are explained with reference to the following figures. In the figures shows:

FIG. 1 a sorting material feed of a sorting arrangement according to an embodiment of the invention;

FIG. 2 a sorting arrangement according to an embodiment of the invention;

FIG. 3 a first exemplary embodiment of a pouch sorter;

FIG. 4 a second exemplary embodiment of a pouch sorter; and

Figure 5:
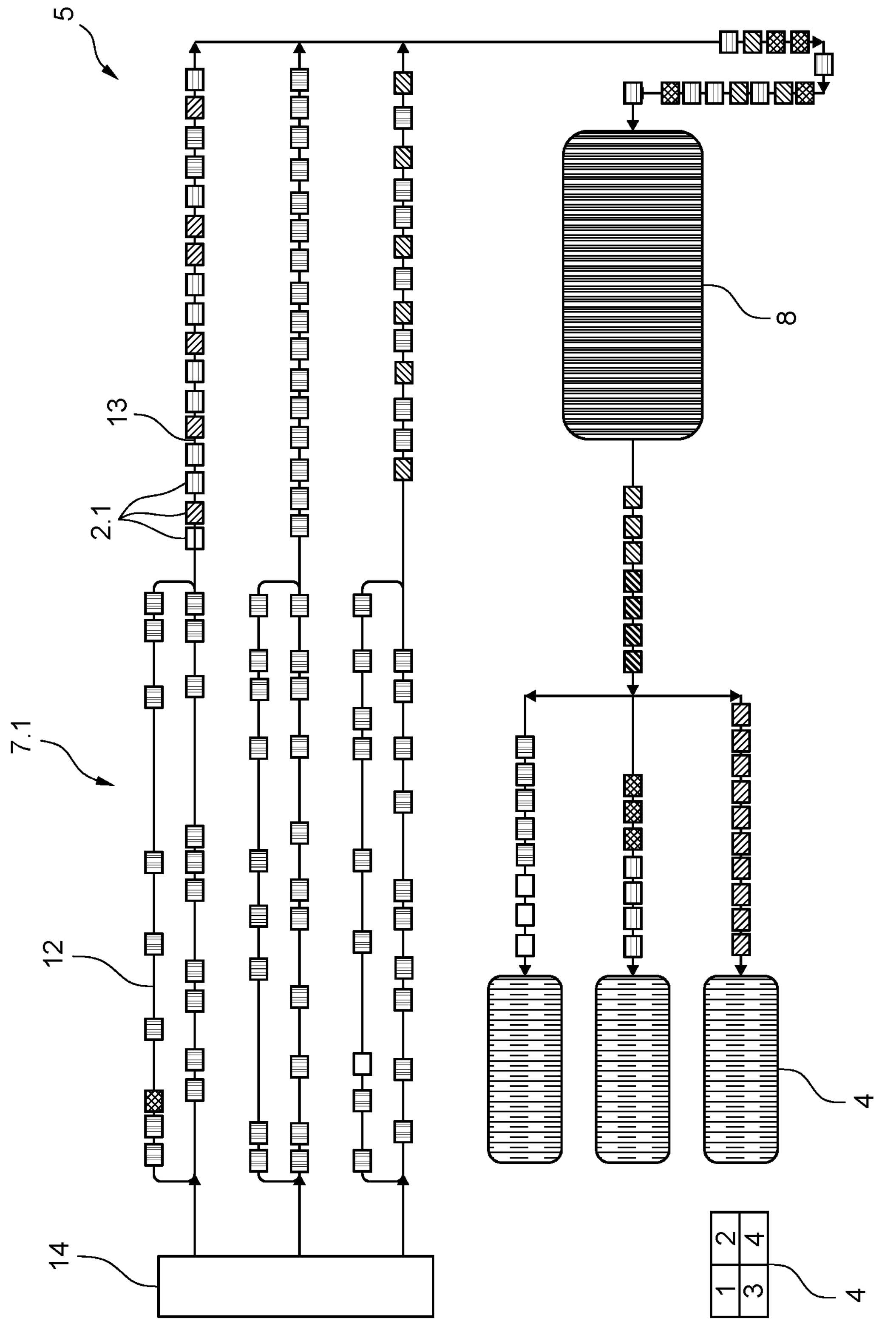

FIG. 5 a third embodiment of an exemplary pouch sorter.

DETAILED DESCRIPTION

Example embodiments will now be described more fully with reference to the accompanying drawings.

FIG. 1 shows an exemplary embodiment of a sorting material feed for a sorting arrangement according to the invention. In principle, it can be provided that an object to be sorted is fed either into the deck sorter 1 or into the pouch sorter 5 depending on an object-specific selection criterion. The object-specific selection criterion can be, for example, an object weight, an object volume, an object dimension or an object target. The sorting arrangement or the illustrated sorting material feed can have a dimensioning-weighing-scanning system 9 for detecting the object-specific selection criterion. For example, particularly bulky or heavy objects can be detected as such by the dimensioning-weighing-scanning system 9 and fed into the deck sorter 1, in particular can be placed on or inserted into one of the load receiving means 2 of the deck sorter 1. The deck sorter can be, for example, a cross-belt sorter sufficiently known from the prior art.

In particular, light objects which are not suitable for transport via the deck sorter 1 can be detected as such by the dimensioning-weighing-scanning system 9 and discharged in the direction of the pouch sorter 5. For example, these objects can be transferred to an automatic feed 11 of the pouch sorter 5, in which the objects are inserted into a pouch which forms the load receiving means 2 of the pouch sorter. In order to increase the operational reliability, a further dimensioning-weighing-scanning system 9 can be connected directly upstream of the automatic feed 11, in order, for example, to avoid blocking the automatic feed, or in order to add up a plurality of objects which are inserted into the same pouch with regard to their dimensions, weights or the like, in order to achieve optimized filling of the pouch. The pouch sorter 5 furthermore has a manual small-material feed 10 which allows the manual insertion of objects which cannot be sorted in an automatable manner or which can be introduced into the sorting arrangement.

An exemplary sorting arrangement is shown in FIG. 2. This can be used, for example, in a distribution center of the CEP industry and there has the task of receiving parcels, packages and other items of goods, in general items of mail, within certain dimensions and weights and distributing them to shipping directions.

In contrast to a warehouse shipping center, the CEP distribution center does not handle orders, but rather distributes the delivered volume of items of mail as completely as possible in a defined time window, during the so-called shift. The items of mail arrive in a temporally uncorrelated manner in various transport means. In this case, the items of mail can already be separated according to size, but do not have to. The items of mail can be unloaded automatically, semi-automatically or manually.

Loosely loaded items of mail are placed immediately on the sorting system, and for packaged items of mail, for example, on pallets or in roll containers, the order can be placed on the sorter if personnel and free capacity are available on the sorter. If the CEP service provider processes parcels and packages separately in his network, different sorters matched to the product spectrum are usually also found in his distribution center. The items of mail are distributed after the address label which contains the direction information has been read electronically. The direction information predominantly forms the only sorting criterion which is obtained from an address database. During a shift, the assignment of the directions to the end points 4 is usually fixed, with the result that there is little scope for optimizations with regard to personnel use (travel routes, etc.).

The deck sorter 1 is generally embodied as a closed loop (loop) or in line form as a so-called line sorter. Both types have in common that their number of load receiving means 2 on which the items of mail or objects to be sorted are transported to the end points is small in relation to the distributed number of items of mail per hour, typically less than 1:10. Thus, for example, a package sorter 500 meters long can have 500 load receiving means 2 with a distribution capacity of 9000 items of mail per hour. The reason for this is inter alia the comparatively high cost share of the load receiving means 2 in the entire deck sorter 1.

The distribution capacity of a deck sorter has its practical limits at approximately 10,000 to 20,000 items per hour. In order to achieve higher capacities within a distribution center, a plurality of sorters must therefore be used, which usually discharge into common end points 4. The relatively small number of load receiving means 3 has the consequence that a load receiving means 2 is only occupied by one item of mail as intended from the task until it reaches the end point 4 and is again available for a new occupation after the discharge of the item of mail into the end point 4. Otherwise, the distribution capacity of the deck sorter 1 falls significantly. A deck sorter 1 is therefore not suitable for the intermediate storage of items of mail.

The function of the intermediate storage of the items of mail which have the same shipping direction is performed by the end points 4. For operational reasons, the items of mail are collected in the end point 4 before an employee removes them and loads them. The loading can take place as loose in swap decks or trucks, roll containers, sacks or containers. Small items of mail are often also discharged directly into transport means, in particular when small goods sorters are used. A specific sequence of the items of mail in the end points 4 corresponding to a delivery list (stop list of the parcel carriers) cannot be generated. The number of end points results from the operational requirement of how many directions are loaded by the distribution center in question. The number and the storage volume of the end points 4 determine the area requirement of the end points 4 in the distribution center and therefore significantly influence the size and the costs of the building and of the sorter 1 which has to reach all the end points 4. The end points 4 are usually located on the hall floor for operational reasons and compete with the rest of the logistic management. They therefore constitute a cost-intensive storage medium.

The emptying of the end points 4 and the loading of the items of mail takes place predominantly by persons. The actual loading activity is accompanied by the unproductive travel routes in order to go to a full end point 4 and empty it. If full end points 4 are not emptied immediately, the items of mail intended for these end points 4 remain on the sorter 1 and reduce the distribution capacity.

The last minutes of a shift before the so-called cut-off time constitute a particular challenge. It is true that as many items of mail as possible are to be distributed and sent in order to achieve a high degree of service. However, the personnel requirement increases significantly as a result in order to empty all the end points 4 shortly before the cut-off time.

To solve this problem, the sorting arrangement according to the invention shown in FIG. 2 proposes a combination of a deck sorter 1 and a pouch sorter 5, it being possible in particular to shift the intermediate storage capacity from the end points 4 to the pouch sorter. Since pouch sorters 5 are particularly well suited in principle to arranging essential functional assemblies, for instance a pouch buffer 7 or a sequencing 8, one above the other in a vertical arrangement, the pouch sorter has a comparatively smaller footprint while maintaining at least the functionality of the deck sorter.

Furthermore, pouch sorters 5 offer the property that the number of load receiving means 2, consequently of the pouches, can be scaled virtually as desired. In addition, there are relatively low costs per load receiving means 2, with the result that a functional expansion of the pouch sorter 5 is possible without considerable additional costs. Furthermore, the pouch sorter also offers, not only the pure transport and sorting task, the already aforementioned essential functions of the buffering and sequencing of items of mail which can be provided by a deck sorter only to a limited extent or not at all.

The intermediate buffering in the pouch sorter 5 can typically be installed in a free space of a hall by the hanging arrangement of the load receiving means 2. Since no access to the system is required, this assembly can be implemented in the vertical direction above the hall floor, without occupying functional and cost-intensive floor space. Furthermore, the use of a pouch sorter with its buffer and sequencing function allows a decoupling of logical sorting targets (LAM unloading stations) and physical end points. This also results in significant saving potentials in the infrastructure of a distribution center.

The automatic sorting processes can be structured, for example, as follows. Small items of mail are conveyed automatically for loading a load receiving means 2 of the pouch sorter 5. Conveyable items of mail are divided into those that can be transported both on a deck sorter 1 and on a pouch sorter 5, and those that can only be sorted on a deck sorter 1. Items of mail which run via a deck sorter 1 are discharged directly to the respective end point 4. The same applies to the manually treated non-conveyable items of mail which are brought manually directly to the end point 4 or wait for the respective distribution on a manual intermediate store.

Items of mail which are sorted via the pouch sorter 5 can be buffered on the latter. For this purpose, a pouch buffer 7.1 can be provided. This pouch buffer 7.1 is typically designed as a dynamic buffer which can consist of any desired number of load receiving means 2, in this case pouches, and therefore ensures the greatest possible flexibility. Only when at least one criterion for the discharge occurs are the items of mail in question discharged from the pouch buffer 7.1 in a targeted manner. However, this criterion is typically not limited to a departure time, a volume calculation, a prioritization, a weight class, a size class, but it can also be another criterion according to which sorting can take place.

After discharging from the pouch buffer 7.1, the sorting capacity can be increased via a further buffer. This presorting can be carried out fully automatically on the basis of various criteria. The criteria are usually, but not exclusively, at least one of departure time, forwarding agent, volume calculation, prioritization, weight class, size class, but it can also be any other criterion according to which classification can take place.

The comparatively higher sorting capacity in relation to pure deck sorter arrangements allows the end points 4 to be made more compact and therefore the space requirement in the distribution center to be reduced. For this purpose, the load receiving means 2 are transported in the sequence produced to one or more unloading stations 6, which can be designed as pouch emptying. These unloading stations 6 can be designed both for manual emptying and also allow fully automatic emptying of the load receiving means 2. If required, the items of mail separated fully automatically from the load receiving means 2 are consolidated with the items of mail separated manually. Further consolidation can take place between the items of mail which have been sorted via the pouch sorter 5 and the items of mail sorted with the aid of the deck sorter 1. However, consolidation within the meaning of the invention generally does not require the items of mail to be recombined, consequently to form a uniform sorting volume. In particular, it does not have to be provided that the items of mail are combined with one another, for example tilted together, in a single unloading station. Rather, different end points 4 which have the same sorting target but have been loaded by different sorters, for example by the deck sorter 1 on the one hand and by a pouch sorter 5 on the other hand, can be combined in order to be loaded uniformly, for example onto the same transport vehicle, without the items of mail of both end points 4, for example of both grid boxes, being mixed with one another in the process.

Furthermore, the productivity of the employee can be increased since distances between the end points 4 are reduced by the goods being transported to the employee. The employee no longer has to go to the end point 4. This is implemented in particular in that the load receiving means 2 of the pouch sorter 5 can be buffered and sequenced, for which purpose the already mentioned pouch buffer 7.1 and the sequencing 8 can be provided. As a result of the buffering and sequencing, the load receiving means 2 can serve in a targeted manner precisely those items of mail which are also required for loading at a specific time to an employee. As a result, many end points 4 no longer have to be open simultaneously in order to be filled sporadically over the course of an entire shift. This buffering which takes place in the deck sorter 1 substantially at the end points 4 is performed by the at least one pouch buffer 7.1 in the pouch sorter 5. As a result, valuable functional floor space is available for other tasks and is no longer occupied by buffer media, in particular by end points 4.

FIG. 3 shows an exemplary embodiment of a pouch sorter 5 according to the invention. The pouch sorter 5 has a dynamic buffer 14 into which the pouches 2.1 are introduced after their loading and are stored up to a request. The dynamic buffer 14 has, in particular, the function of acting on the first pouch buffer 7.1, which is designed as a dynamic batch buffer, with further pouches 2.1 to be sorted precisely to the extent that the sorting capacity of the first pouch buffer 7.1 is optimized. While the dynamic buffer 14 can be scaled virtually as desired, the first pouch buffer 7.1 has a limited sorting capacity and scalability.

The first pouch buffer 7.1 has a plurality of buffer circuits 12 arranged parallel to one another. The buffer circuits 12 in each case have a discharge 13 which combine downstream (cf. FIGS. 4 and 5). It is provided that those pouches 2.1 which form a group of pouches 2.1 which have the same sorting target, consequently an assignment to the same end point 4, are kept available in the same buffer circuit 12. In this respect, therefore, during the transfer of the pouches 2.1 from the dynamic buffer 14 into the 1. pouch buffer 7.1, a pre-sorting takes place, although a plurality of the groups of pouches 2.1 described above are kept available per buffer circuit 12. In response to a request, the pouches 2.1 which are assigned to the same group, consequently have the same sorting target, can be discharged from the buffer circuit 12 into the connected discharge 13. The pouches 2.1 of the same group can be discharged in such a way that, after discharging, they form a compact group of pouches 2.1 of the same group, consequently are sorted in relation to their sorting target. This is shown in FIG. 4. In the embodiment according to FIG. 4, the sorted groups can be fed to an end point 4 in question in accordance with their sorting target.

In the embodiment according to FIG. 5, by contrast, during the discharging of the groups of pouches 2.1 with the same sorting target, a mixed group of pouches 2.1 of different sorting targets is generated, wherein all pouches 2.1 of the discharged groups are contained in the group in an arbitrary sequence. Preferably, after discharging, no more pouches 2.1 of a previously discharged group are kept available in the first pouch buffer 7.1 or in the buffer circuit 12 in question.

The separation of the pouches 2.1 according to their groups or sorting targets takes place in a sorting matrix 8 to which the pouches 2.1 are fed via the discharge 13 after discharging. As can be seen in FIG. 5, the plurality of complete groups of pouches 2.1 of the same sorting target are fed to the sorting matrix 8 in an arbitrary sequence. The pouches 2.1 leave the sorting matrix 8 in a sorted manner, i.e. as a compact group of pouches 2.1, wherein all pouches 2.1 assigned to a group of pouches with the same sorting target are discharged from the sorting matrix 8 directly successively.

It can furthermore be seen from FIG. 5 that the sorting matrix 8 can be set up to additionally produce a sequence of the pouches 2.1 within the same group in addition to the sorted purity, consequently to generate sequencing of the pouches 2.1. This sequencing can be provided, for example, to achieve a further sorting stage in a mail distribution center, for example sorting to a smaller postal code spectrum.

Compared with the sorting arrangements known from the prior art, the number of sortable items of mail per unit time is therefore increased. Buffer capacities are increased and the space in a distribution center is used more efficiently, in particular in the vertical. As a result, structural infrastructure requirements are reduced and sequencing in the sorting is produced by the use of the pouch sorters 5, as a result of which downstream processes are simplified.

The features of the invention disclosed in the above description, in the drawing and in the claims can be essential both individually and in any desired combination for implementing the invention.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A method for sorting objects of different shapes, volumes and/or weights, the method comprising sorting of a plurality of first objects to be sorted with a deck sorter into at least one first end point of the deck sorter, the method further including sorting of a plurality of second objects to be sorted with a pouch sorter with a plurality of load receiving means designed as hanging pouches for objects to be sorted, wherein the method further includes emptying of the pouches of the pouch sorter in at least one second end point different from the at least one first end point, assigning a same sorting target to the first and second end points;

buffering the second plurality of objects in pouches of the pouch sorter in a pouch buffer, wherein the pouches are buffered in a plurality of groups, wherein pouches of a same group are configured to be emptied into the same at least one second end point, and wherein the pouches of the same group are discharged from the pouch buffer together and are fed to the at least one second end point as a compact group of pouches.

2. The method according to claim 1, which further comprises a step of determining of an object-specific selection criterion for each of the plurality of the first plurality of objects and the second plurality of objects to be sorted, the objects to be sorted being fed into the deck sorter or into the pouch sorter depending on the determined object-specific selection criterion.

3. The method according to claim 2, in which the determining of the object-specific selection criterion has a determining of an object target, an object weight, an object shape, an object dimension or an object volume and a step of comparing of the object-specific selection criterion determined in this case with a respectively permissible value range for feeding into the pouch sorter.

4. The method according to claim 3, in which in the case where the determined object-specific selection criterion lies outside the permissible value range for the feeding into the pouch sorter, the object to be sorted is fed into the deck sorter or fed out for manual sorting.

5. The method according to claim 1, wherein the pouches of the discharged groups are fed in any desired sequence to a sequencing sorting matrix.

6. The method according to claim 5, in which the pouches of the groups of pouches fed to the sequencing sorting matrix are discharged from the sequencing sorting matrix in a sequence with respect to one another, in which the pouches of the same group are arranged directly successively.

7. The method according to claim 6, in which, after discharging, each of the groups of pouches are fed to the at least one second end point as a compact group of pouches and the objects received in the pouches are emptied into the at least one second end point simultaneously or in a continuous sequence.

8. The method according to claim 7, which additionally comprises further sequencing of the pouches of the same group before the emptying of the pouches into the second end point, wherein the pouches of the same group are brought into a specific sequence with respect to one another, in which they are fed to the second end point.

9. The method according to claim 1, in which the first plurality of objects are transported by the deck sorter directly into the first end point, wherein the second plurality of objects are transported to the at least one second end point only when a sorting criterion for a consolidated sorting of all objects fed into the pouch sorter and assigned to the same at least one second end point is reached or a sorting command is generated.

10. The method according to claim 1, which further comprises a measurement of at least one physical variable of all of the second plurality of objects which have been fed into the pouch sorter, the second plurality of objects being emptied into the second end point when a threshold value for the physical measurement variable is reached.

11. A method of sorting objects of different shapes, volumes and/or weights in a distribution center, said method comprising:

measuring a characteristic of the objects and comparing the measured characteristics with a threshold, transporting a first plurality of objects exceeding the threshold to a deck sorter;

emptying the first plurality of objects into a first box in the deck sorter at a first end point;

transporting a second plurality of objects having characteristics beneath the threshold to a pouch sorter located above the deck sorter;

buffering the second plurality of objects in pouches of the pouch sorter in a pouch buffer, wherein the pouches are buffered in a plurality of groups, wherein pouches of a same group are emptied at the same at least one second end point, wherein the pouches of the same group are discharged from the pouch buffer together and are fed to the at least one second end point different from the first end point in a second box as a compact group of pouches;

the first and second endpoints having a same sorting target;

combining the first plurality and second plurality of objects in the first box and second box to form a bundle;

transporting the bundle to the sorting target or intermediate station; and loading the bundle onto a transport vehicle.

* * * * *